July 7, 1964  H. E. JACKSON  3,139,952
LUBRICATION SYSTEMS FOR VEHICLES AND MACHINES
Filed Dec. 13, 1961  5 Sheets-Sheet 1

INVENTOR
HAROLD ERNEST JACKSON
BY
ATTORNEYS

July 7, 1964  H. E. JACKSON  3,139,952
LUBRICATION SYSTEMS FOR VEHICLES AND MACHINES
Filed Dec. 13, 1961  5 Sheets-Sheet 3

INVENTOR
HAROLD ERNEST JACKSON
BY Hane and Ndick
ATTORNEYS

INVENTOR
HAROLD ERNEST JACKSON

July 7, 1964
H. E. JACKSON
3,139,952
LUBRICATION SYSTEMS FOR VEHICLES AND MACHINES
Filed Dec. 13, 1961
5 Sheets-Sheet 5
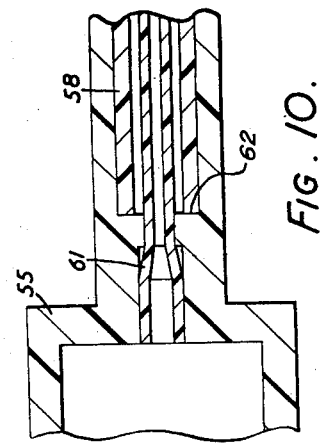
FIG. 10.
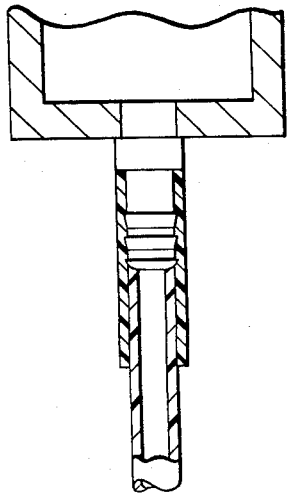
FIG. 9.
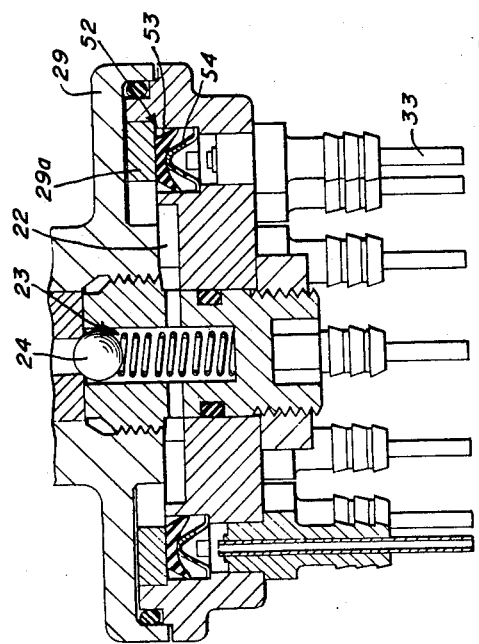
FIG. 8.
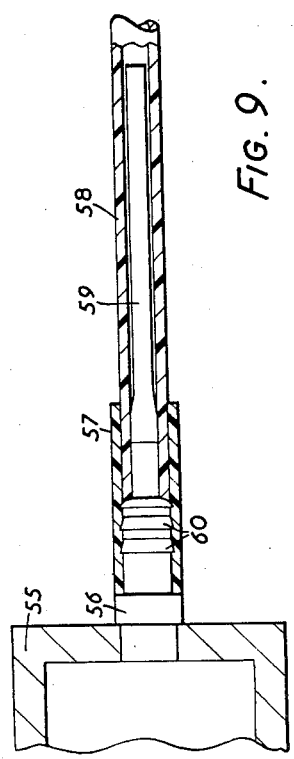
INVENTOR
HAROLD ERNEST JACKSON
BY Hane and Nydick
ATTORNEYS United States Patent Office 3,139,952
Patented July 7, 1964

3,139,952
LUBRICATION SYSTEMS FOR VEHICLES
AND MACHINES
Harold Ernest Jackson, Plympton, Devon, England, assignor to Tecalemit Limited, Plymouth, Devon, England, a British company
Filed Dec. 13, 1961, Ser. No. 159,098
Claims priority, application Great Britain Dec. 22, 1960
9 Claims. (Cl. 184—7)

This invention relates to lubrication systems for vehicles and other machines.

According to the present invention there is provided a lubricating system for a mechanism including movable parts the system comprising a solenoid operated pump, means responsive to movement of one of the movable parts to cause energization of the solenoid a predetermined number of times per unit movement of that part, and means coupling the pump to a point to be lubricated.

Further according to the present invention there is provided a lubricating system for a mechanism including movable parts the system comprising a solenoid operated pump, a switch operable by movement of one of the movable parts to cause energization of the solenoid a predetermined number of times per unit movement of that part, the pump having an inlet coupled to a lubricant reservoir and an outlet coupled to a point to be lubricated.

According to another aspect of the present invention there is provided a lubricating system for a vehicle comprising a solenoid operated pump, means responsive to movement of a rotatable member to cause energization of the solenoid and means coupling the pump to a point to be lubricated.

Still further according to the present invention there is provided a lubricating system for a vehicle comprising a solenoid operated pump, a member rotatable in accordance with the speed of movement of the vehicle, and a switch operable thereby to cause energization of the solenoid the pump having an inlet coupled to a lubricant source and an outlet coupled to a point to be lubricated.

The present invention also includes a solenoid operated pump comprising a piston movable in a cylinder, the position of the piston being determined by the solenoid armature and a spring, the cylinder including an inlet and an outlet, a non-return valve being provided at the outlet the distance of the non-return valve from the piston at the end of an operating stroke of the latter being selected so that in the event that the outlet is in communication with the atmosphere, the air entrained by the piston will not attain a pressure sufficient to lift the non-return valve.

According to the present invention there is also provided a solenoid operated pump comprising a cylinder, a piston therein operable by a spring biased armature, a primary and secondary winding and a switch operable by the armature for bringing one winding into circuit when the air gap is at a maximum and to bring both windings into circuit in series when the air gap has been reduced.

In order that the present invention may be more readily understood there will now be described two embodiments thereof, given by way of example only, reference being had to the accompanying drawings in which:

FIGURE 8 is an axial cross-section of a part of the modified pump.

FIGURES 9 and 10 show arrangements for attaching a capillary tube to a lubricant outlet.

Figure 1:
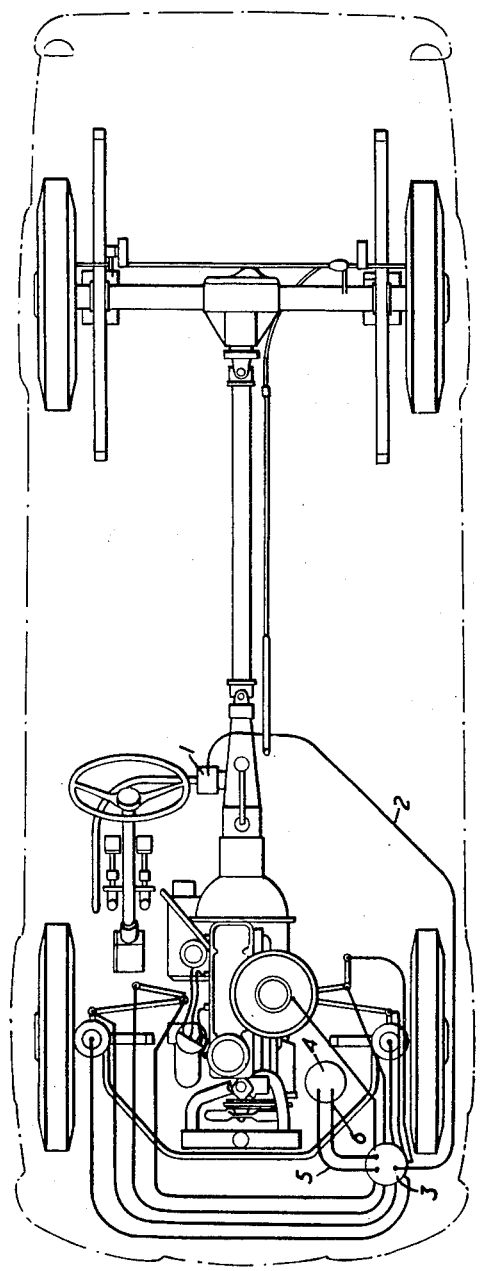
FIGURE 1 shows diagrammatically the lubrication system of a vehicle.

Referring to FIGURE 1 there is shown diagrammatically a gear driven electric control switch 1 connected by an electric cable 2 to a solenoid operated pump 3. This pump 3 in turn is connected to a lubricant reservoir 4 by means of a supply line 5 on the one hand and an air vent line 6 on the other.

Figure 2:
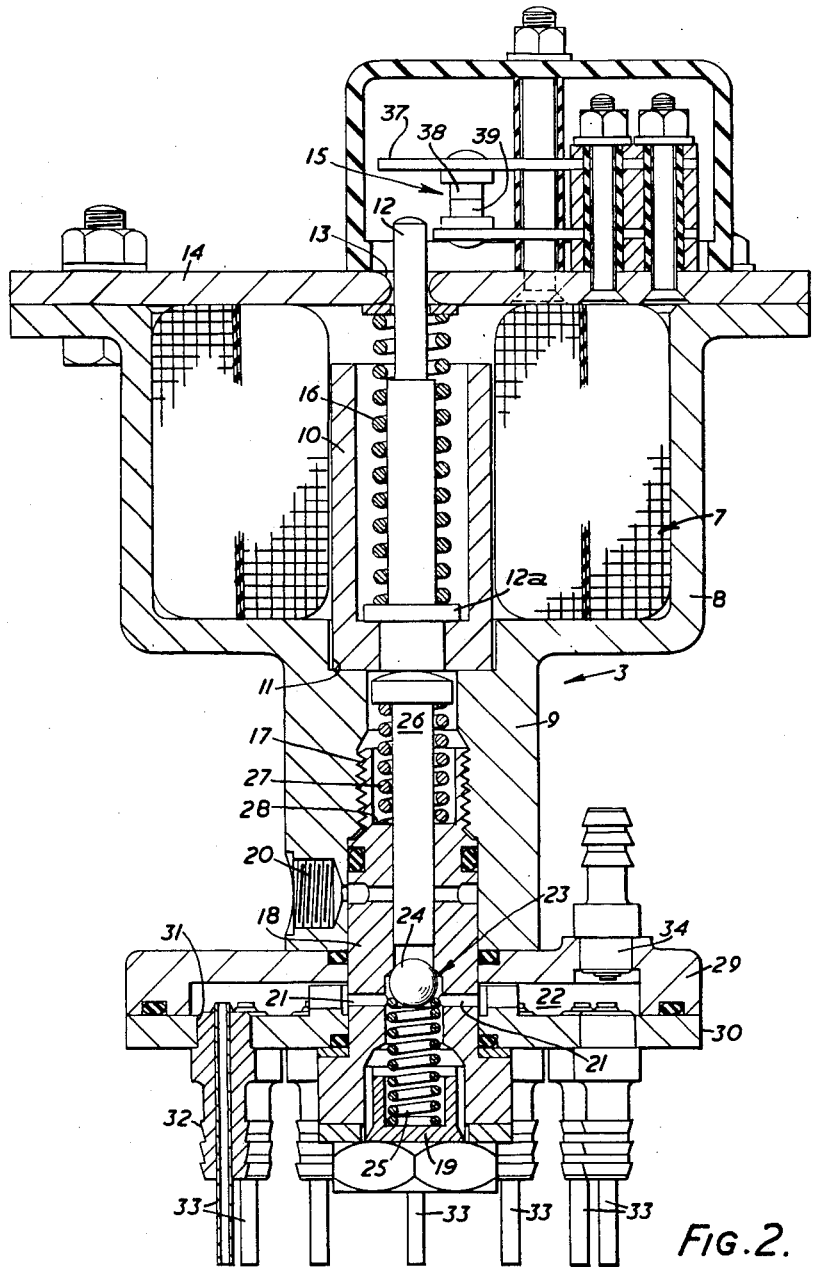
FIGURE 2 is an axial cross-section of a solenoid operated pump.

As seen more clearly from FIGURE 2 the pump 3 is operated by means of a solenoid 7. The pump comprises a main body portion which may be of any suitable shape, here shown as a cylindrical bowl 8 from the base of which extends a cylindrical stem 9, of less diameter than the main body portion. The solenoid 7 fits in the cylindrical bowl 8 and the armature 10 of which is normally supported with its lower end resting in a recess 11 in the bottom of the cylindrical bowl. The armature is cylindrical and hollow with its upper end open. Mounted on the bottom of the armature cavity is a push rod 12 which extends upwards beyond the upper end of the armature and through an aperture 13 in a bowl closure plate 14. The armature is spring biased away from the plate 14, by a spring 16 surrounding the push rod 12 and in compression between the plate 14 and a flange 12a at the base of the push rod. On the outside of the plate 14 under a suitable cover is mounted a shorting switch 15, the purpose of which will hereafter be described.

The cylindrical stem 9 is provided with a coaxial bore 17 one end of which opens into the recess of the cylindrical bowl 8 and the other end of which receives in sealing engagement of a cylinder 18. This cylinder 18 is open at its end that engages the cylindrical block but is closed by a plug 19 at its other end. A lubricant inlet 20 to the cylinder is provided in the form of a radial port passing through the cylindrical block 9 and the cylinder 18. This lubricant inlet is also in connection with the lubricant reservoir 4. Axially spaced from the lubricant inlet there are provided lubricant outlet ports 21 which communicate with an annular chamber 22 surrounding the cylinder.

The cylinder is provided with a check valve 23 upstream of the outlet ports. In this embodiment the check valve comprises a ball valve 24 biased by means of a spring 25 abutting the plug 19 to close the coaxial bore of the cylindrical block 9 to lubricant flowing upwards but enabling lubricant to flow downwards under pressure into and through the outlets 21.

The pump also includes a piston operable within the cylinder 18 and the coaxial bore 17 to force lubricant received through the inlet 20 under pressure out through the outlets 21.

In this embodiment the piston comprises a cylindrical rod 26 the end of which furthermost from the ball valve is biased by a spring 27, surrounding that part of the rod projecting into the coaxial bore, into engagement with the armature. The spring 27 rests against a head of the piston rod and the base of a countersinking 28 in the upper end of the cylinder. The forces of the spring 16 and the spring 27 are such that movement of the piston away from the ball valve ceases on abutment of the piston and armature. When the piston is in its upper limit position its lower end is above the inlet and when in its lower limit position it occludes the inlet. The ball valve is spaced from the inlet and from the lower end of the piston in the lower limit position thereof by an amount such that when the cylinder contains air, e.g. when the reservoir is empty, movement of the piston from its upper limit to its lower limit will produce insufficient air pressure to overcome the ball valve bias.

Figure 3:
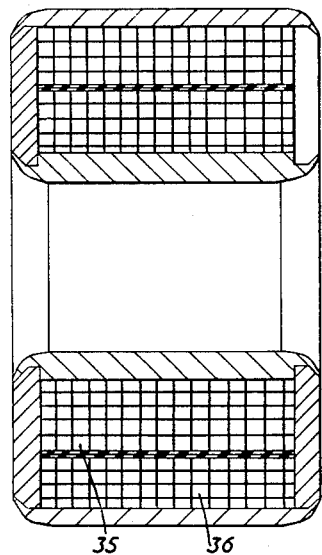
FIGURE 3 shows diagrammatically the solenoid coil.

The lubricant outlet ports 21 communicate with an annular chamber 22 formed between two disc shaped plates 29, 30 arranged in sealing engagement surrounding the cylinder, the upper one of which 29 abuts the lower end of the cylindrical stem and is provided with an annular groove which together with the upper surface of the lower plate 30 forms the chamber 22. The lower plate 30 is provided with a plurality of apertures 31 into each of which fits a lubricant discharge connector 32 which has an axial bore for receiving a capillary tube 33. Each capillary tube, which may be of flexible material, projects beyond the end of the lubricant discharge connector. By varying the length and internal diameter of the capillary tube differing flow rates of lubricant may be obtained to suit the different parts to be lubricated. The upper plate 29 is provided with an aperture 34 adapted to receive the air vent line 6 which connects the chamber 22 with the lubricant reservoir at a part above the level of the lubricant. This construction enables any air present in the chamber 22 to be vented to the lubricant reservoir instead of passing to the capillary tubes. The solenoid coil shown in more detail in FIGURE 3, comprises two coils one within the other. The inner coil 35 forms a primary winding and the outer coil 36 forms a secondary winding. The two windings are connected in series to the control switch 1 across the vehicle battery, but normally the outer coil is shorted through the shorting switch 15 mounted on the outside of the plate 14. Thus when the control switch 1 is first closed only the primary winding 35 is energized, a relatively large current being taken from the vehicle battery, with the result that a relatively strong field of force is generated for raising the armature. When the armature nears the end of its stroke the rod 12 projecting through the plate 14 engages a projection 37 extending from the upper contact 38 of the switch 15 to move this contact against spring bias out of contact with the lower contact 39 to open the switch and bring both windings in series.

Figure 4:
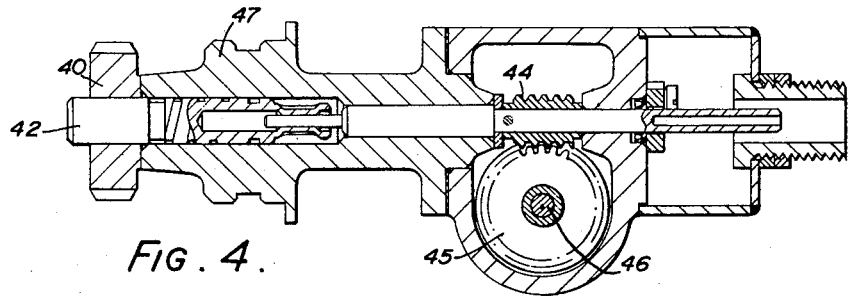
FIGURE 4 is an axial cross-section of the gear box unit.
Figure 5:
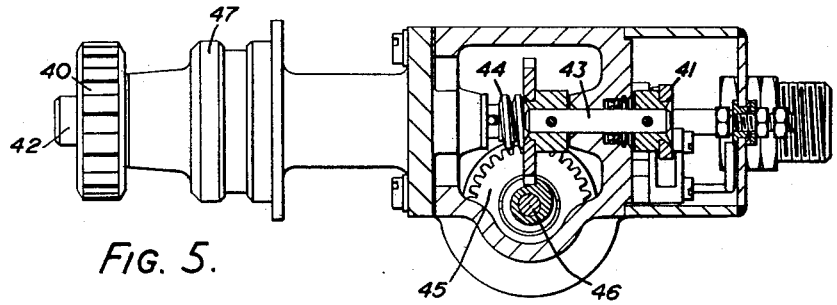
FIGURE 5 is a section of the gear box unit taken on a plane displaced from that of the section shown in FIGURE 4.

For effecting the alternate opening and closing of the electric control switch 1 an adapter assembly shown in FIGURES 4 and 5 is provided.

Thus, the assembly comprises a drive shaft 42 which at one end, is fast, in respect of rotation, with a gear wheel 40, and at the other end is adapted for direct connection to the speedometer cable (not shown). The assembly has an outer casing 47 which, at the end adjacent to the gear wheel, is adapted to be fitted in sealed relation in an opening in the wall of the vehicle gear box, so that the gear wheel is in mesh with the aforesaid appropriate gear wheel in the gear box. Thus the drive shaft 42 is driven and in turn drives said cable.

The cam 41 is mounted on a relatively short cam shaft 43 which is parallel to the drive shaft, and the drive shaft 42 is coupled to the cam shaft by means of the aforesaid step down transmission gearing. This consists of a worm 44 on said drive shaft which drives a worm wheel 45 on a lay shaft 46 at right angles to and spaced equidistantly from said drive shaft and cam shaft, and a second worm on the lay shaft which drives a worm wheel on the cam shaft.

The control switch 1 is a simple make-and-break switch one of whose contacts is carried by a leaf spring which bears on the cam. The shape of the cam may be such that the closed period of the switch is short in comparison with the open period, so that overheating and waste of energy is avoided.

It will be understood, that the whole assembly is enclosed in the aforesaid outer casing 47, except the gear wheel which projects beyond the casing at the left hand end. The assembly thus simply takes the place of the usual adaptor which is fitted on to the end of the speedometer cable and includes a gear wheel similar to the gear wheel of said assembly and a part, similar to the equivalent part of the assembly casing, adapted to be fitted, in sealed relation, in the opening in the gear box wall.

Operation is as follows:

Assuming the pump is initially in the "rest" position as shown in FIGURE 2 but with all the lubricant passages filled, and the control switch 1 in the open position, when the cam 41 closes the control switch 1 the primary winding 35 of the solenoid is energized causing the armature 10, the push rod 12 and the cylindrical rod 26 to move upwards. As the armature approaches the limit of its travel the push rod contacts the projection 37 from the upper contact 38 of the shorting switch to open the contacts and energize the secondary winding of the solenoid.

It is to be noted that the primary winding is used alone when maximum energy is required, owing to the fact that the air gap is a maximum, and a relatively large amount of current is therefore required to operate the armature. Both windings are used in series when the armature is at its upper position and the air gap is a minimum so that only a relatively small current is required. This feature of the invention guards against the overheating of the solenoid and the consumption of too much battery current if the vehicle should stop for a prolonged period while the control switch is closed.

As the cylindrical rod 26 rises it sets up a reduced pressure in the portion of the cylinder between the cylindrical rod and the ball valve 24 and when the lower end of the piston uncovers the lubricant inlet lubricant from the reservoir rapidly flows into the cylinder. When the circuit is broken by the cam and the solenoid is no longer energized the armature is forced downwardly by its biasing spring 16 against the action of spring 27 and as soon as the cylindrical rod has reclosed the lubricant inlet it forces a charge of lubricant past the ball valve through the lubricant outlet ports into chamber 22 and causes lubricant to enter the capillary tubes to flow to the various parts to be lubricated. When the armature and cylindrical rod are in their lowermost positions the pump is again in its "rest" position.

A modified form of the invention is shown in FIGURES 6 to 10, like apparatus bearing the same reference numerals.

In this modification the pump is provided with an additional terminal 48, an additional fixed contact 49 and an additional moving contact 50. The purpose of this is to enable an additional pump (not shown) to be actuated to feed lubricant to additional parts to be lubricated.

Figure 7:
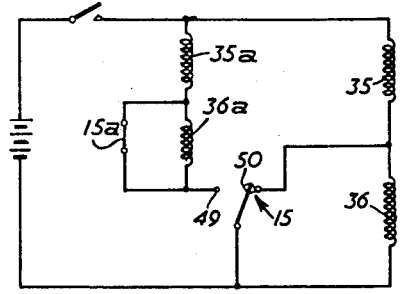
FIGURE 7 shows an electrical circuit including two solenoid operated pumps.
Figure 6:
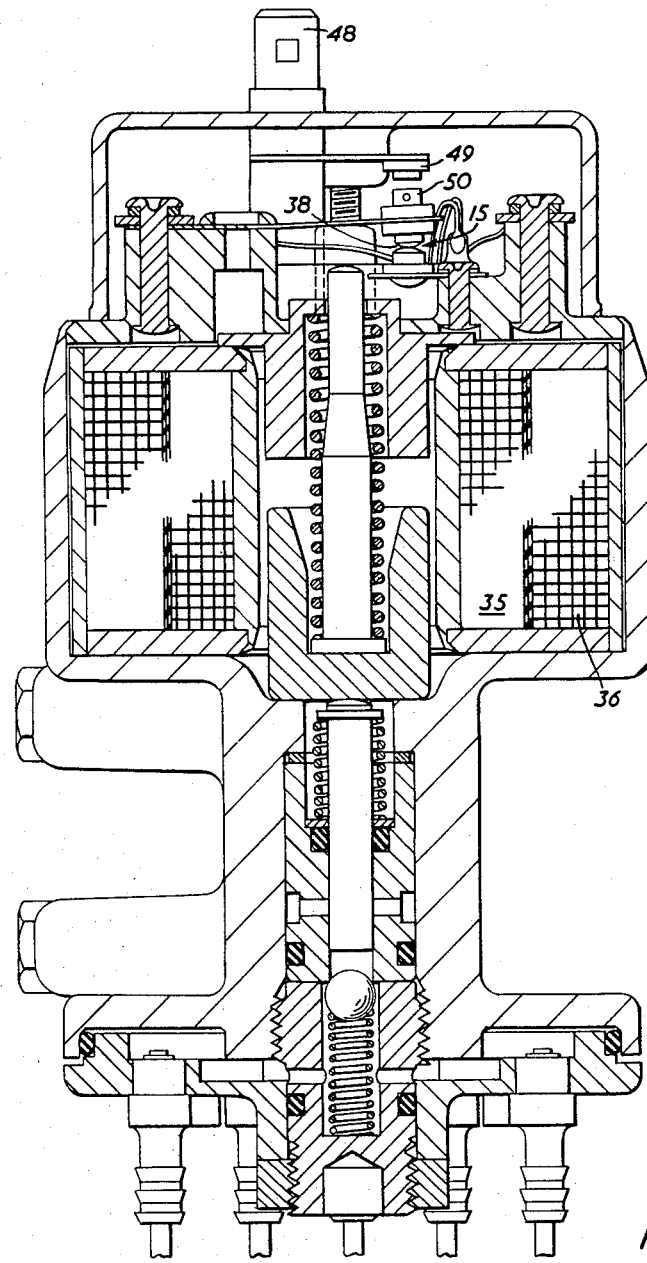
FIGURE 6 is an axial cross-section of a modified solenoid operated pump.

Referring to FIGURES 6 and 7 when the cam 41 closes the control switch the primary winding 35 of the solenoid is energized causing the armature 10, the push rod 12 and the cylindrical rod 26 to move upwards. As the armature nears the limit of its travel the rod moves the contacts 38 and 50 to open the shorting switch 15 but to close the contacts 49 and 50. This causes energization of the secondary winding 36 and also the energization of a primary winding 35a (FIGURE 7) of a second pump. This second pump operates in a similar way to the first pump to open a closed shorting switch 15a to cause energization of the secondary winding 36a of this pump. When the cam again opens the control switch 1 both solenoids are de-energized and lubricant is pumped out through the respective outlets.

In another embodiment each capillary tube may extend downstream of means preventing the charged lubricant from draining into the bearings while the vehicle is inoperative. In the embodiment shown in FIGURE 8 these means are in the form of a non-return valve 52 which includes a seal 53 of synthetic resin or similar material arranged on supporting means 54, the upper plate 29, a seal backing ring 29a.

FIGURE 9 shows an arrangement for attaching the capillary tubes to the lubricant outlet. In this embodiment there is shown a manifold 55 which receives a ferrule 56, both of which are preferably made of metal. A sleeve 57 made of synthetic resin or similar material is coupled to a tube 58 enclosing a capillary tube 59, the sleeve 57 being secured to one end of the ferrule 56, for which purpose the ferrule is provided with a plurality of annual flanges 60.

FIGURE 10 shows a further arrangement for attaching the capillary tube to the lubricant outlet. One end 61 of the capillary tube is flared and protrudes beyond the end of the sleeve 58. The sleeve is received by an axial bore of the manifold, that bore including a shoulder 62, the flared end of the capillary tube extending through the bore lying beyond the shoulder. With this arrangement an effective seal between the capillary tube and manifold is obtained, as lubricant flowing to the capillary tube will force the flared end into engagement with the shoulder 62 of the bore. In this embodiment the sleeve and manifold may be made of synthetic resin or similar material.

I claim:

1. In a lubricating system including a solenoid-operated device for increasing the pressure of a lubricant and control means for controlling the operation of said solenoid-operated device, the improvement wherein said solenoid-operated device comprises the combination of pump means, an armature operatively connected to said pump means, a first and second winding adjacent said armature operable when energized to advance said armature into a given direction, and switch means actuated by said control means for first energizing said first winding and for subsequently energizing both said first and second windings in response to movement of said armature as caused by the prior energization of said first winding.

2. A lubricating system as set forth in claim 1, wherein said solenoid-operated device further comprises a pair of relatively movable contacts operable in response to movement of said armature to complete a conductive path, said completed conductive path being adapted to operate a second lubricant-pumping means.

3. A lubricating system as set forth in claim 1, wherein said solenoid-operated device further comprises a contact member, and said switching means comprise a pair of switch contacts which when disengaged provide for energization of both said first and second windings, the movement of said armature effecting separation of the contacts of said pair of switch contacts and also engagement of said contact member with one contact of said pair of switch contacts thereby to complete a conductive path, said completed conductive path being adapted to operate a second lubricant pump means.

4. A lubricating system as set forth in claim 1, wherein said solenoid-operated device further comprises means for biasing said armature in a direction opposite to said given direction.

5. A solenoid pump for use in a lubricating system, said pump comprising a cylinder; a piston mounted for reciprocating movement in said cylinder, said piston being operable to pump fluid during reciprocating movements of the piston; means operatively connected to said piston for causing reciprocation thereof, said means including a movable armature for operating said piston, a resilient means for urging said armature into a limit position, and an electrically operated means urging, when energized, said armature into another limit position, said electrically operated means including a primary and a secondary winding adjacent said armature, and switch means operable to connect the primary winding in an energizing circuit when the armature is in said one limit position by the action of said resilient means and to connect both said windings in series when the armature is in said other limit position by the energization of the primary winding.

6. In a lubricating system including a solenoid-operated device for increasing the pressure of a lubricant and a control means for controlling the operation of said solenoid-operated device, the improvement wherein said solenoid-operated device comprises, in combination, a cylinder, a piston reciprocably slidable in said cylinder, means for reciprocating said piston in said cylinder, fluid inlet and fluid outlet means for said cylinder, a non-return valve in said fluid outlet means, said valve being located at a position removed from the end of the operating stroke of said piston such that when the inlet means is in communication with the atmosphere the air entrapped in the cylinder by the piston will not attain a pressure sufficient to lift the non-return valve.

7. In a lubricating system including a solenoid-operated device for increasing the pressure of a lubricant and a control means for controlling the operation of said solenoid-operated device, the improvement wherein said solenoid-operated device comprises the combination of cylinder means, a piston reciprocally mounted in said cylinder means, a chamber connected to said cylinder means for receiving lubricant discharged by said piston, a first non-return valve included in the connection between the cylinder means and the chamber, capillary conduits extending between said chamber and points to be lubricated, and a second non-return valve between said chamber and said conduits.

8. A lubricating system as set forth in claim 7, wherein said second non-return valve comprises supporting means in an extension of said chamber, and a seal member on said supporting means, said second valve providing a directional flow from said chamber through said extension to said conduits.

9. In a lubricating system for a mechanism having moving parts to be lubricated, the combination comprising a solenoid operated device having a solenoid and a pump operated thereby, said solenoid having an armature and a first and second winding adjacent said armature, said windings when energized advancing said armature in a given direction for operating said pump, switch means operable for first energizing said first winding and for subsequently energizing both said first and second windings in response to a movement of said armature as caused by the prior energization of said first winding, and means for causing energization of the solenoid a predetermined number of times per unit movement of a movable part of the mechanism to be lubricated.

References Cited in the file of this patent

UNITED STATES PATENTS

| | | |
|---|---|---|
| 1,923,364 | Frenger | Aug. 22, 1933 |
| 1,945,596 | Chryst | Feb. 6, 1934 |
| 1,955,109 | Zerk | Apr. 17, 1934 |
| 2,029,327 | Lippincott | Feb. 4, 1936 |
| 2,546,585 | Caldwell | Mar. 27, 1591 |
| 2,568,757 | Mesh | Sept. 25, 1951 |
| 2,705,458 | Sunden | Apr. 5, 1955 |
| 2,780,312 | Le Bocey | Feb. 5, 1957 |
| 2,806,432 | Brooks | Sept. 17, 1957 |
| 2,951,556 | Jackson et al. | Sept. 6, 1960 |

FOREIGN PATENTS

| | | |
|---|---|---|
| 655,112 | France | Dec. 8, 1928 |